United States Patent Office 2,874,820
Patented Feb. 24, 1959

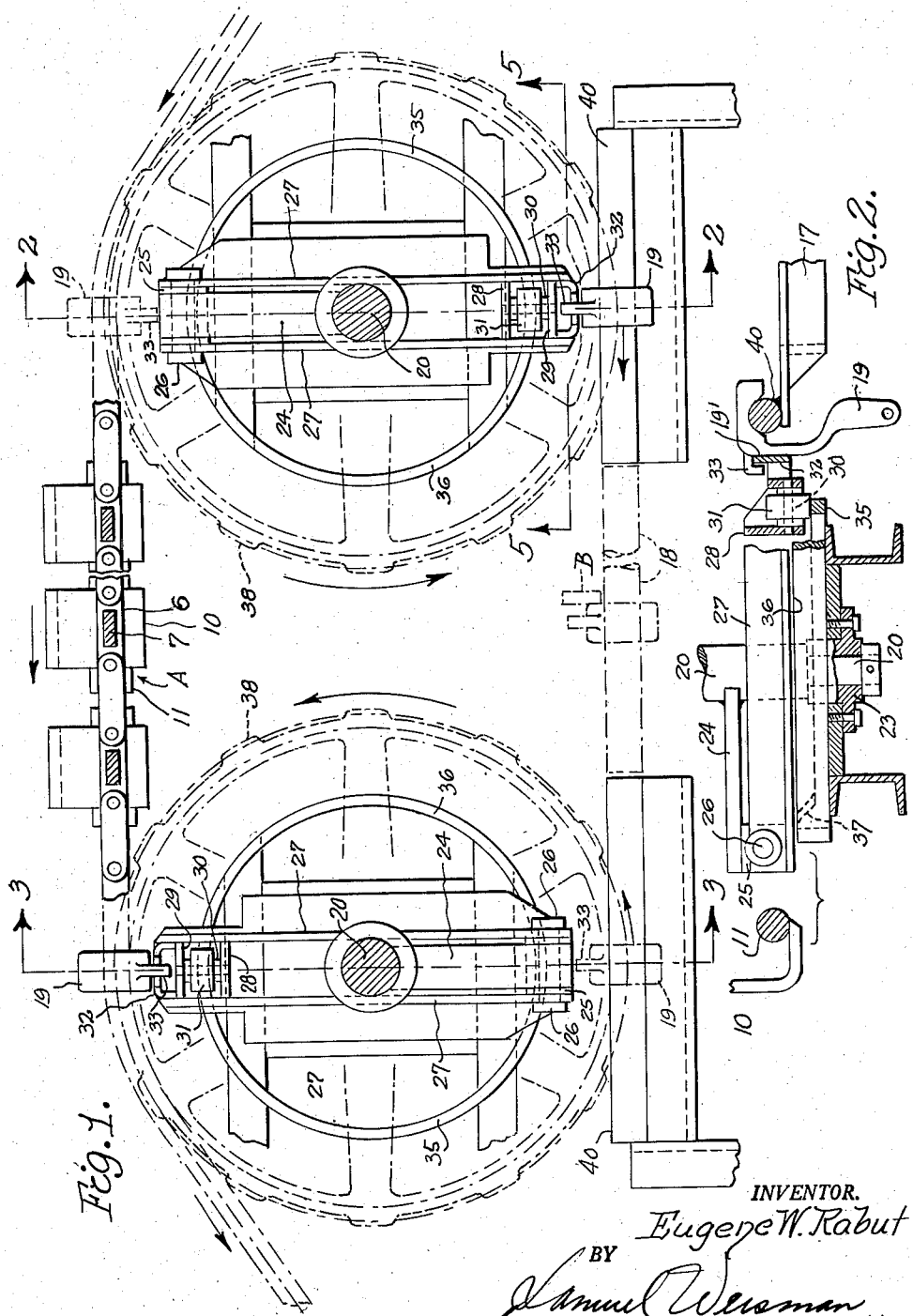

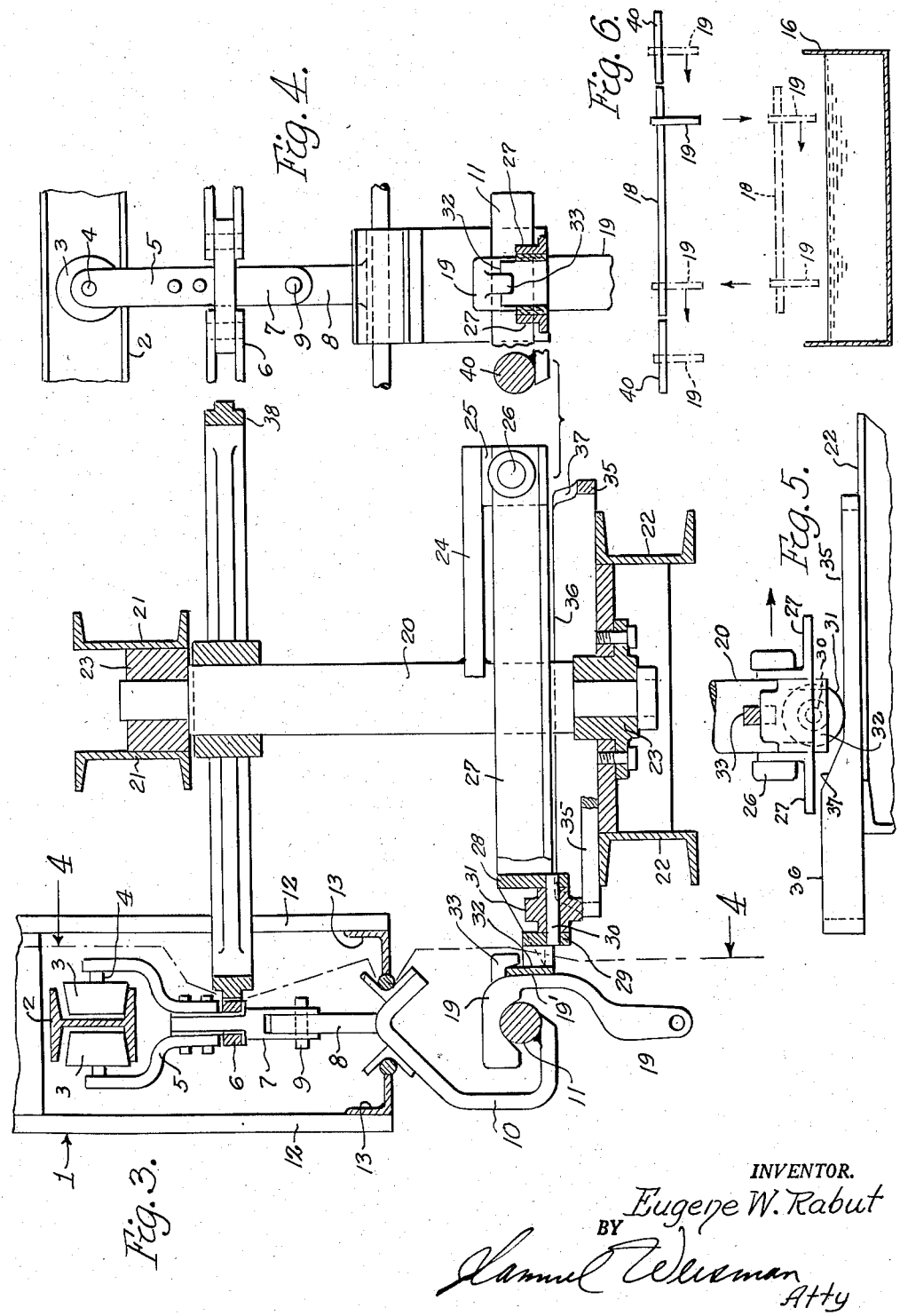

2,874,820

TRANSFER APPARATUS

Eugene W. Rabut, Detroit, Mich., assignor to The Udylite Corporation, Detroit, Mich., a corporation of Delaware Application March 12, 1954, Serial No. 415,745

4 Claims. (Cl. 198—25)

The present invention pertains to a novel transfer or work loading apparatus for moving work pieces from one mechanism to another.

As an example, it is often desirable to transfer work from a conveyor to a treating tank and then from the tank back to the conveyor. One of the objects of the invention is to provide a relatively simple and dependable apparatus for this purpose. Another object is to provide a transfer unit which, when duplicated in the assembly, accomplishes the two movements mentioned above.

In the accomplishment of the invention, with reference to the aforementioned illustration, the transfer units are mounted between the conveyor and the conveying rail of a tank installation. Both the conveyor and the rail are designed to support work-carrying hooks from which the work is suspended.

Each transfer unit includes a vertically mounted rotatable shaft carrying an arm pivoted thereto and projecting laterally therefrom. The free end of the arm carries a finger engageable with a pick-up hook formed on the back of the carrying hook. A portion of the arm, such as a roller, rides on a cam fixed in a position concentric with the shaft. The cam has high and low portions which raise and lower the arm in its rotation. The parts are so dimensioned and related to the high and low portions of the cam that the finger lifts the work-carrying hook from one of the carrying devices and deposits it on the other.

In a system involving two such units, one unit transfers the work from the conveyor to the rail, and the other returns the work from the rail to the conveyor.

The invention is fully disclosed by way of example in the following description and in the accompanying drawings in which Figure 1 is a plan section of the apparatus;
Figures 2 and 3 are sections on the lines 2—2 and 3—3 of Figure 1;
Figure 4 is a section on the line 4—4 of Figure 3;
Figure 5 is a section on the line 5—5 of Figure 1, and
Figure 6 is a diagrammatic view showing the movement of work into and out of a tank.

Reference to these views will now be made by use of like characters which are employed to designate corresponding parts throughout.

In Figure 1 is shown a chain conveyor having straight horizontal span in at least a portion of its course. The conveyor is of conventional construction and is illustrated more or less diagrammatically in Figure 3. A fixed overhead structure 1 carries an I-beam 2 which determines the course of the conveyor. A suitable number of work suspension trolley units are suspended from the beam. Each such unit comprises a pair of opposed rollers 3, each having a shaft 4 from which is suspended a hanger 5. The opposed hangers carry a double chain 6 and a depending fork 7 in which is pivotally mounted an arm 8 on a pin 9. To the lower end of the arm is secured a conveyor hook 10, and on the bottom of the hook is welded or otherwise secured a bar 11 which obviously moves with the conveyor. On the scale shown, the bars may be about four inches long and one and a half inches in diameter. The bars are of such length that they take the turns in the course of the conveyor without interfering with other parts. Hangers 12 are suspended from the structure 1 and carry inwardly directed angle pieces 13 at the lower ends. These pieces carry guide rods 14 disposed at opposite sides of the arm 8 and receive angle pieces 15 welded on the top of the hook 10, whereby the hook is guided. The guide bars 14 are continuous or substantially so.

Opposite the straight horizontal span of the conveyor is a rail type plating machine with the necessary accessories as shown for example in the United States patents to John V. Davis No. 2,479,322 of August 16, 1949, and No. 2,650,600 of September 1, 1953. The machine includes a tank 16 divided into compartments and carrying inwardly extending arms 17 (Figure 2) at the top for the purpose of supporting alined rail segments 18. Work carrier hooks 19 are adapted to be suspended from the rail segments 18 as well as from the bars 11, and the work pieces are suspended from the hooks in any known or desired manner. Pushers B (Figure 1) are provided for advancing the hooks on the segments 18, and certain of the segments may be lifted when the work is to be moved over a dividing partition in the tank, as disclosed in the aforementioned patents.

At each end of the straight span A of the conveyor is provided a transfer mechanism for moving a work carrier hook from the span to a rail segment 18 or vice versa. Since the units are alike, only one will be described. Each unit includes a vertical shaft 20 between upper and lower frame structures 21 and 22 and mounted in bearings 23 therein. A heavy radial bar 24 is rigidly fixed to the shaft as shown in Figure 3 and carries at its free end a pivot block 25. On a pivot pin 26 in the block are mounted two angle members 27 straddling the shaft 20 and extending some distance beyond it where they are joined by a pair of braces, 28, 29 to form a pivoted arm. A pin 30 mounted in the braces and lying lengthwise of the arm carries a roller 31 for a purpose that will presently be described. At the free end of the arm is secured a pick-up finger 32 extending upward beyond the upper surface of the arm at this end and receivable in a pick-up hook 33 formed on the back of each carrier hook 19.

On the structure 22 is mounted a circular cam 35 concentric with the shaft 20 and having a radius equal to the distance of the roller 31 from the center of the shaft 20. The cam is so positioned in elevation that the roller rides thereon. The cam includes an elevated portion 36 extending through an arc somewhat greater than 180° and of uniform height except at its ends 37 which slope down to the lower level. The arc of the portion 36 may vary according to the pick-up and drop-off points as will presently appear. Each shaft is driven by suitable means such as a sprocket wheel 38 secured thereon and meshing with the chain 6 at spaces between the hangers.

In the operation of the device, the described unit transfers work from one path to the other. In the described installation a carrier hook 19 is lifted from a conveyor bar 11 by cam action, swung around by the arm 27, and deposited on a movable loader bar 40 adapted to aline with the segments 18. Such a loader bar with mechanism for moving it angularly upward and downward is shown in the U. S. patent to John V. Davis No. 2,645,186 of July 14, 1953. In loading the tank 16, the bar 40 is first alined with a conveyor bar 11 and is then shifted to aline with a rail segment 18 at an elevated level. A similar mechanism for unloading, operating in reverse, is provided at the unloading end of the tank, and the cam-operated device at this end returns from the corresponding loader bar to the conveyor. The loader bars may alternatively be moved vertically without lateral motion by the mechanism disclosed in the previously mentioned patents. On being returned to the conveyor the work may be taken to finishing apparatus if necessary. The plating machine, however, is merely illustrative of a dipping apparatus or other apparatus that performs work which cannot be done satisfactorily at the conveyor.

The arm 27 is pivoted to the free end of the bar 24 rather than directly to the shaft 20 to provide a larger radius in the lifting and dropping movements and hence a more nearly vertical movement of the carrier hook 19 in moving off and on the members 11 and 18. It is also to be noted that the back 19' has a vertical plane engaged by the forward vertical plane of the pick-up finger 32 to prevent rocking of the carrier 19.

Although a specific embodiment of the invention has been illustrated and described, it will be understood that various alterations in the details of construction will be made without departing from the scope of the invention as indicated by the appended claims.

What I claim is:

1. A transfer apparatus comprising a vertically mounted rotatable shaft, a stationary continuous cam surrounding said shaft and having high and low portions, a bar having one end secured to said shaft, an arm pivoted to the free end of said bar and crossing said shaft, a finger on the free end of said arm, and a member on said arm engaging said cam, a pair of work-supporting devices adjacent to spaced points of said cam, a work carrier adapted to be mounted on either of said devices, a pick-up hook on the back of said carrier and adapted to receive said finger, the ends of the high portion of said cam sloping to said low portion and being disposed at said devices, whereby said finger lifts said hook substantially vertically from one of said devices and deposits it on the other device on rotation of said shaft.

2. A transfer apparatus comprising a vertically mounted rotatable shaft, a stationary continuous cam surrounding said shaft and having high and low portions, an arm pivotally joined to said shaft at a point exterior of said cam, a finger on the free end of said arm, and a member on said arm engaging said cam, a pair of work-supporting devices adjacent to spaced points of said cam, a work carrier adapted to be mounted on either of said devices, a pick-up hook on the back of said carrier and adapted to receive said finger, the ends of the high portion of said cam sloping to said low portion and being disposed at said devices, whereby said finger lifts said hook substantially vertically from one of said devices and deposits it on the other device on rotation of said shaft, the back of said carrier and the forward face of said finger having each a vertically alined portion engageable one with the other, to prevent swinging of said carrier.

3. A transfer apparatus comprising a vertically mounted rotatable shaft, a stationary continuous cam surrounding said shaft and having high and low portions, a bar having one end secured to said shaft, an arm pivoted to the free end of said bar and crossing said shaft, a finger on the free end of said arm, and a member on said arm engaging said cam, a pair of work-supporting devices adjacent to spaced points of said cam, a work carrier adapted to be mounted on either of said devices, a pick-up hook on the back of said carrier and adapted to receive said finger, the ends of the high portion of said cam sloping to said low portion and being disposed at said devices, whereby said finger lifts said hook substantially vertically from one of said devices and deposits it on the other device on rotation of said shaft, the back of said carrier and the forward face of said finger having each a vertically alined portion engageable one with the other, to prevent swinging of said carrier.

4. A transfer apparatus comprising a conveyor having a substantially straight span, a rail parallel to and spaced from said span having portions disposed adjacent to the ends of said span, a pair of transfer units between said rail portions and said span and disposed substantially tangentially to said span and rail, each unit comprising a vertically mounted shaft, a stationary continuous cam surrounding said shaft and having high and low portions, a bar having one end secured to said shaft, an arm pivoted to the free end of said bar and crossing said shaft, a finger on the free end of said arm, and a member on said arm engaging said cam, a work carrier adapted to be mounted either on said conveyor or on said rail, a pickup hook on the back of said carrier and adapted to receive said finger, the back of said carrier and the forward face of said finger having each a vertically aligned portion engageable one with the other to prevent swinging of said carrier, the ends of the high portion of said cam sloping to said low portion and being disposed at said span and said rail portions, means for moving said carrier along said rail, and means for rotating said shaft whereby said carrier is transferred from said rail to said conveyor and vice versa.

References Cited in the file of this patent

UNITED STATES PATENTS

| | | |
|---|---|---|
| 2,120,052 | Bishop | June 7, 1938 |
| 2,255,922 | Finson | Sept. 16, 1941 |
| 2,628,702 | Mabrey | Feb. 17, 1953 |